United States Patent Office 3,734,915
Patented May 22, 1973

3,734,915
N-[-(4 - PHENYL-1-PIPERAZINYL)ALKYL]BENZO[b] THIOPHENE OR BENZOFURAN - 2 - CARBOXAMIDES
William Blythe Wright, Jr., Woodcliff Lake, N.J., and Herbert Joseph Brabander, Nanuet, N.Y., assignors to American Cyanamid Company, Stamford, Conn.
No Drawing. Continuation-in-part of application Ser. No. 8,090, Feb. 2, 1970, now Patent No. 3,646,047. This application Oct. 15, 1971, Ser. No. 189,727
Int. Cl. C07d 51/70
U.S. Cl. 260—268 FT                 8 Claims

ABSTRACT OF THE DISCLOSURE

The preparation of N-(secondary-aminoalkyl)derivatives of benzo[b]thiophene-2-carboxamide and benzofuran-2-carboxamide by reacting the corresponding benzo[b]thiophene or benzofuran carboxylic acid with N,N'-carbonyldiimidazole and subsequently with a primary alkylamine, is described. Other methods of preparing the compounds of this invention are also described.

The present compounds possess central nervous system (CNS) activity and are useful as tranquillizers, CNS depressants, and analgesics.

This application is a continuation-in-part of application Ser. No. 8,090, filed Feb. 2, 1970, now U.S. 3,646,047.

SUMMARY OF THE INVENTION

This invention relates to new compounds. More particularly, it relates to novel N - (secondary - aminoalkyl) derivatives of benzo[b]thiophene-2-carboxamide and benzofuran-2-carboxamide and methods of preparing the same.

The novel compounds of the present invention may be illustrated by the following formula:

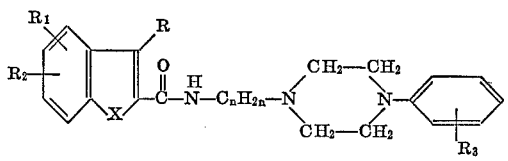

wherein R and $R_1$ are selected from the group consisting of hydrogen, straight chain lower alkyl and halogen; $R_2$ is selected from the group consisting of hydrogen, lower alkyl, halogen, and trifluoromethyl; X is oxygen or sulfur; $n$ is an integer from 2 to 5; $R_3$ is selected from the group consisting of lower alkyl, lower alkoxy, halogen and trifluoromethyl; and non-toxic acid addition salts thereof.

The terms lower alkyl and lower alkoxy are intended to include those having 1 to 4 carbon atoms. Halogen includes chlorine, bromine, and fluorine.

More particularly, the preferred compounds of this invention are those in which R, $R_1$ and $R_2$ are hydrogen or halogen, X is sulphur or oxygen, and $n$ is 2 to 5.

The free bases of the active compounds of this invention, in general, may be either liquids or solids at room temperature. The free bases, are in general, relatively insoluble in water, but soluble in most organic solvents such as lower alkyl alcohols, benzene, acetone, chloroform, and the like. These compounds form acid addition salts with strong acids, such as hydrochloric acid, sulfuric acid, perchloric, and the like. The compounds also form salts with organic acids, as for example, fumaric and maleic acid. Such salts, in general, are soluble in water, methanol and ethanol, but relatively insoluble in benzene, ether, petroleum ether, and the like.

The compounds of this invention can be prepared by one of the following methods of which the first method has been found to be the preferred and most advantageous.

First method: A reactive benzo[b]thiophene-2-carboxamide or benzofuran-2-carboxamide is prepared as an intermediate followed by reaction with the alkylene diamine.

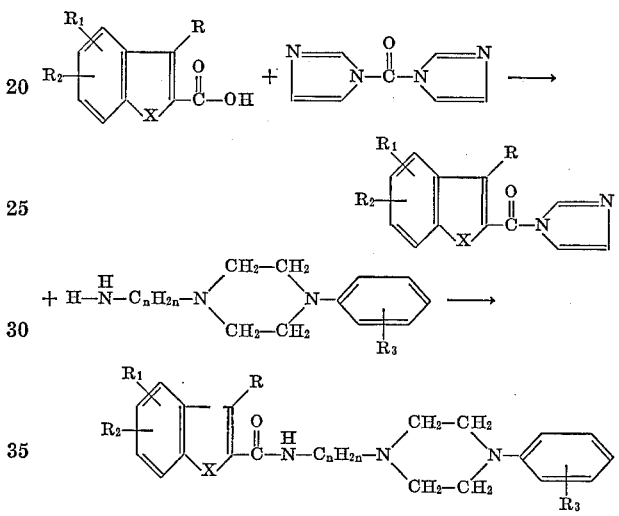

wherein R, $R_1$, $R_2$, $R_3$, X and $n$ are as hereinbefore defined. This reaction is best carried out in two steps and tetrahydrofuran is a satisfactory solvent. A temperature range of 25–75° C. is most desirable.

Second method: The compounds of the present invention can also be prepared by other methods. One of these involves the preparation of a benzo[b]thiophene-2-carbonyl chloride or bromide or benzofuran-2-carbonyl chloride or bromide as an intermediate followed by reacting with an alkylenediamine:

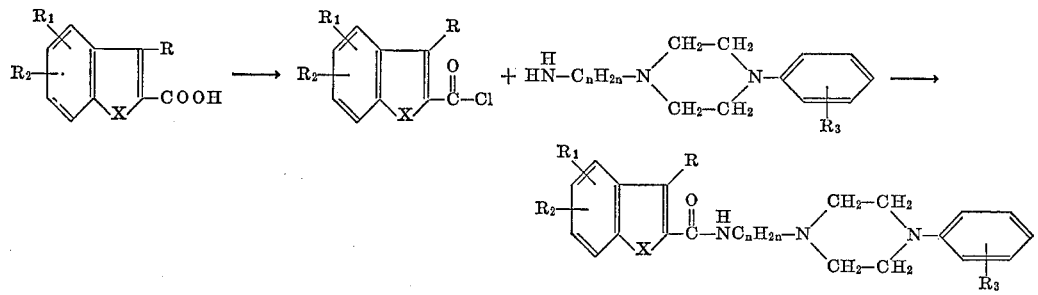
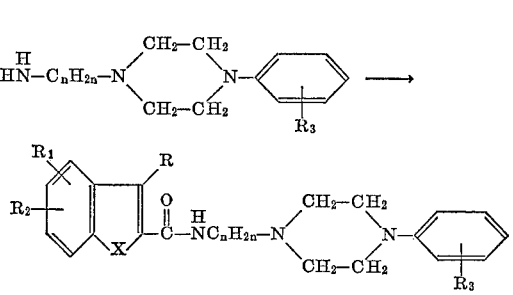

wherein R, $R_1$, $R_2$, $R_3$, X, and $n$ are as defined hereinbefore.

In this process, the carboxylic acid is reacted with a halogenating agent such as thionyl chloride in an inert solvent. The carboxylic acid chloride is isolated and reacted with an alkylene diamine derivative. The products are removed and purified by recrystallization from a suitable solvent. Alternatively, an ester or acid anhydride may be prepared as the intermediate.

Third method: In still another method, the acid and the alkylene diamine are mixed and a carbodiimide derivative is added to effect condensation.

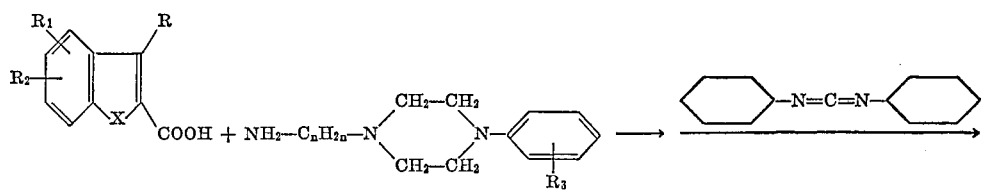

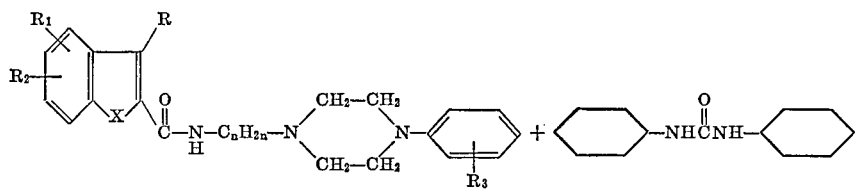

wherein R, $R_1$, $R_2$, $R_3$, X and $n$ are as defined above. This reaction may usually be carried out within a temperature range of 25–100° C. and the product is isolated by procedures well known to the art.

Fourth method: A still further method can be used in which benzo[b]-thiophene-2-carboxamide or benzofuran-2-carboxamide are used as intermediates for alkylation procedures as follows:

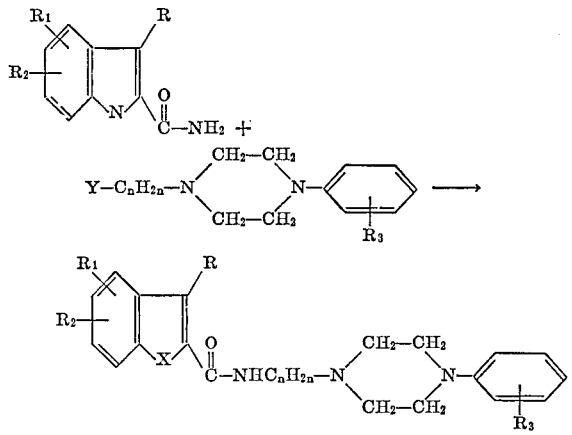

wherein R, $R_1$, $R_2$, $R_3$, X and $n$ are as defined hereinbefore and Y is a reactive halogen, lower alkyl sulfonyloxy or arylsulfonyloxy group. The amide is dissolved in an inert solvent, as for example, diethyleneglycol dimethyl ether (diglyme) and reacted with a condensing agent such as sodium hydride and then with an appropriate aminoalkyl derivative. The reaction may be best carried out at temperatures within the range of about 30° C.–200° C. for a period of from 30 minutes to 6 hours.

Fifth method: Still another method of preparation consists of first preparing the N-(bromoalkyl)benzo[b]thiophene-2-carboxamide or N-(bromoalkyl)benzofuran-2-carboxamide and then reacting this with an amine.

wherein R, $R_1$, $R_2$, $R_3$, X and $n$ are as defined hereinbefore. The reaction in the last step takes place when the reagents are contacted in an inert solvent such as ethanol, tetrahydrofuran, toluene, benzene and the like and the reagent mixture is maintained within the temperature of from about 50° to 150° C. for a period of 10 minutes to several hours.

The benzo[b]thiophene-2-carboxylic acids used as intermediates in the above methods, are prepared by standard literature procedures: D. A. Shirley and M. D. Cameron, J. Am. Chem. Soc. 72, 2788 (1950); N. B. Chapman, K. Clarke, S. D. Saraf, J. Chem. Soc. 1967 (8), 731; Y. Matsuki et al., Nippon Kagaku Zasshi 88, 756 (1967), 86, 102, 643 (1965; J. Schmitt, M. Suquet, P. Comoy, T. Clim and G. Callet, Bull. Soc. Chim. France 1968 (11), 4575; A. J. Krubsack and T. Higa, Tetrahedron Letters No. 49, p. 5149 (1968).

Derivatives of benzofuran-2-carboxylic acid are also well known in the literature. Among the articles describing the preparation of these intermediates are the following: D. S. Deorha and P. Gupta, Indian J. Chem., 2, 459 (1964), Rec. Trav. Chim. 83, 1956 (1964); R. Ramachandran et al. J. Org. Chem. 28, 398 (1963); B. Sila, Roczniki Chem. 38, 1387 (1964); T. Abe and T. Shimizu, Nippon Kagaku Zasshi 87, 870 (1966); R. Kurdukar and N. V. SubbaRao, Proc. Indian Acad. Sci., Sect. A58, 336 (1963).

The compounds of the present invention possess central nervous system (CNS) activity at non-toxic doses and, as such, are useful as highly active tranquilizers and CNS depressants. The compounds have been tested pharmacologically and found to have the above properties which show a desirable wide spread between doses producing depressant or sedative actions and toxic symptoms such as paralysis or lethality. They are also analgesics.

A test which indicates tranquilizing activity is represented by a measure of the reduction in motor activity. An initial dose (usually 50 mg./kg.) is administered intraperitoneally to a group of 5 mice and a 5 minute count

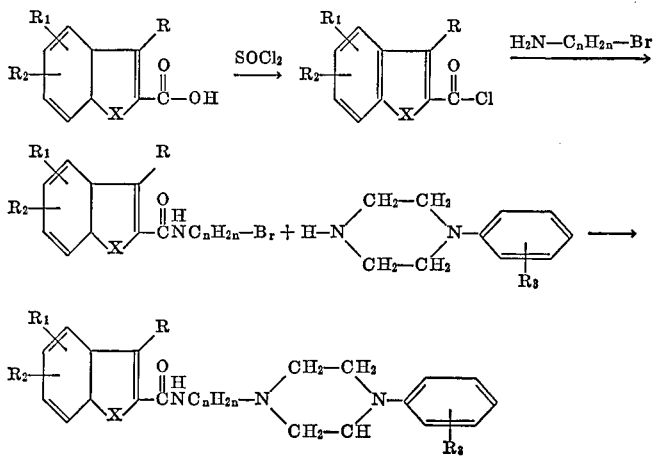

of motor activity is recorded (actophotometer). Counts of ≤250 are considered to indicate a specific reduction (more than two standard deviations) of activity at a dose causing only minimal impairment of neurological function as measured by rod walking ability.

Compounds that appeared to reduce motor activity (≤250 count) at the initial dose, are administered to additional groups of 5 mice at graded doses and tested similarly. The motor depressant dose (MDD) which causes a 50% reduction of motor activity (a count of 250) is estimated. The use of reduced motor activity as a measure of tranquilizing activity has been described by W. D. Gray, A. C. Osterberg and C. E. Rauh, Archives Internationales et de Therapie, vol. 134, p. 198 (1961) and by W. J. Kinnard and C. J. Carr, Journal of Pharmacology and Experimental Therapeutics, vol. 121, p. 354 (1957).

The compounds of this invention also have been found to be active analgesics. The compounds are tested by a modification of the method described by E. Siegmund et al., Proc. Soc. Expt. Biol. Med., 95, 729 (1957). Briefly the test is described as follows: Two mice are administered the test compound, orally, 30 minutes prior to the intraperitoneal injection of 1 mg./kg. phenyl-p-quinone (PPQ). Fifteen minutes later the mice are observed for a period of 3 minutes and the total number of characteristic writhing episodes for both animals is counted and recorded. The mean number of writhes exhibited by 21 pairs of control animals (dosed orally with 2% starch) was 29. For our purposes, any compound that reduces the incidence of writhing to 18 or less is considered active in the (PPQ) test, otherwise the compound is rejected. The activity of representative compounds when tested by the above procedures is summarized in the following table.

TABLE

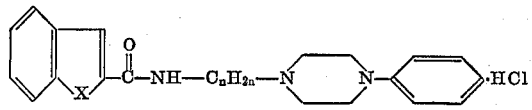

| X | n | CNS depressant, MDD₅₀[1] | Analgesic [2] |
|---|---|---|---|
| O | 2 | 9 | A |
| O | 3 | 12 | A |
| S | 3 | 7 | A |

[1] Effective dose in mg./kg.
[2] A=active at 200 mg./kg.

Compositions containing the benzo[b]thiophene-2-carboxamides and benzofuran-2-carboxamides may be administered to warm-blooded animals orally, or parenterally if desired, and when so administered, may be considered as an agent for relief of pain or for therapeutically desirable treatment of mental disorders in daily doses ranging from about 25 to about 500 milligrams. The dosage regimen can be adjusted to provide optimum therapeutic response. Thus, for example, several smaller doses may be administered daily, or the dose may be reduced proportionately as indicated by the requirements of the particular therapeutic situation.

For therapeutic administration the active compounds of this invention may be incorporated with pharmaceutical carriers such as excipients and used, for example, in the form of tablets, dragées, capsules, suppositories, liquids, elixirs, emulsions, suspensions, syrups, chocolate, candy wafers, chewing gum, or the like. Such compositions and preparations should contain at least 0.1% of active component. The percentage in the compositions and preparations, may, of course, be varied, and may conveniently be between 2% and 60% or more of the weight of the unit. The amount of compound in such therapeutically useful compositions or preparations is such that a suitable dosage will be obtained. Preferred compositions or preparations according to the present invention are prepared so that a dosage unit form contains between about 10 and about 200 milligrams of the active compound. Obviously, in addition to the therapeutic compound there may be present excipients, binders, fillers and other therapeutically inert ingredients necessary in the formulation of the desired pharmaceutical preparation.

DETAILED DESCRIPTION

The following specific examples illustrate the preparation of representative compounds of the present invention. Parts are by weight unless otherwise indicated.

Example 1.—Preparation of N-[3-(4-phenyl-1-piperazinyl)propyl]benzo[b]thiophene-2-carboxamide A mixture of 27.8 parts of benzo[b]thiophene-2-carboxylic acid, 40 parts by volume of thionyl chloride and 200 parts of benzene is heated at reflux temperature for 2 hours and then concentrated to remove the solvent and excess thionyl chloride. The crystalline residue is benzo[b]thiophene-2-carbonyl chloride.

The above product is dissolved in 100 parts of benzene and added with stirring and cooling to a mixture of 22 parts of 3-bromopropylamine hydrobromide, 32 parts of sodium carbonate, 150 parts of water and 200 parts of benzene. The precipitate which separates is filtered off, washed with water and a little ether, and air dried. The N-(3-bromopropyl)benzo[b]thiophene - 2-carboxamide is recrystallized from ethanol and melts at 130–132° C.

A mixture of 3 parts of the above compound, 3.2 parts of 4-phenyl piperazine and 100 parts of benzene is heated at reflux temperature for 2 hours, shaken with dilute sodium hydroxide, washed with water and concentrated. The crystalline residue is recrystallized from ethyl acetate. The pure N-[3-(4-phenyl-1-piperazinyl)propyl]benzo[b]thiophene-2-carboxamide melts at 162–164° C.

The above compound is dissolved in ethyl acetate and ethanolic hydrogen chloride is added. The hydrochloride salt separates and is recrystallized from ethanol, melting point 234–236° C.

Example 2.—Preparation of 3-chloro-N-[2-(4-phenyl-1-piperazinyl)ethyl]benzo[b]thiophene-2-carboxamide A mixture of 14.8 parts of cinnamic acid, 0.8 part of pyridine and 36.3 parts by volume of thionyl chloride is heated on the steam bath for 3 days and then concentrated to remove excess thionyl chloride. The residue is slurried with petroleum ether and the precipitate is filtered off and recrystallized from hexane. The crystalline product, melting point 113°–115° C. is 3-chlorobenzo[b]thiophene-2-carbonyl chloride.

A solution of 1.16 parts of the above acid chloride in benzene is added with stirring to a mixture of 1.03 parts of 2-(4-phenyl-1-piperazinyl)ethylamine, 1.06 parts of sodium carbonate, 50 parts of water and 50 parts of benzene. The reaction mixture is allowed to stir for 20 hours and the layers are separated. The benzene layer is washed with water and concentrated. The residue is recrystallized from ethyl acetate and 3-chloro-N-[2-(4-phenyl-1-piperazinyl)ethyl]benzo[b]thiophene - 2 - carboxamide, melting point 144°–146° C., is obtained. The hydrochloride salt melts at 248–250° C.

Example 3.—Preparation of 3,6-dichloro-N-[2-(4-phenyl-1-piperazinyl)ethyl]benzo[b]thiophene - 2-carboxamide When p-chlorocinnamic acid is substituted for cinnamic acid in the procedure of reaction 2,3,6-dichlorobenzo[b]thiophene-2-carbonyl chloride, melting point 136°–138° C., is obtained as an intermediate and converted to 3,6-dichloro-N-[2-(4-phenyl - 1-piperazinyl)ethyl]benzo[b]thiophene-2-carboxamide, melting point 161–163° C. The hydrochloride salt melts at 223–225° C.

Example 4.—Preparation of N-[2-(4-phenyl-1-piperazinyl)ethyl]benzo[b]thiophene-2-carboxamide A mixture of 5.3 parts of benzo[b]thiophene-2-carboxylic acid, 4.9 parts of N,N'-carbonyldiimidazole and 100 parts of dry tetrahydrofuran is allowed to stand at room temperature for 2 hours and 6.2 parts of 2-(4-phenyl-1-piperazinyl)ethylamine are then added. After 24 hours the solvent is distilled off and the residue is stirred with ether and dilute sodium hydroxide. A precipitate separates and is filtered off and washed with water and then recrystallized from ethyl acetate. N-[2-(4-phenyl-1 - piperazinyl)ethyl]benzo[b]thiophene - 2-carboxamide melts at 194°–196° C. The hydrochloride salt melts at 273°–275° C.

Example 5.—Preparation of N-[3-(4-phenyl-1-piperazinyl)propyl]benzofuran-2-carboxamide When benzofuran-2-carboxylic acid is treated with N,N'-carbonyldiimidazole and 3-(4-phenyl-1-piperazinyl)propylamine by the procedure of Example 4, the above compound, melting point 167°–169° C., is obtained. The hydrochloride salt melts at 229°–232° C.

Example 6.—Preparation of N-[3-(4-m-fluorophenyl-1-piperazinyl)propyl]benzo[b]thiophene-2-carboxamide If 4-m-fluorophenyl-1-piperazine is substituted for 4-phenylpiperazine in the procedure of Example 1, the above compound is obtained.

Example 7.—Preparation of N-[3-(4-m-ethylphenyl-1-piperazinyl)propyl]benzo[b]thiophene-2-carboxamide When 4-m-ethylphenyl-1-piperazine is substituted for 4-phenylpiperazine in the procedure of Example 1, the above compound is obtained.

Example 8.—Preparation of 5-bromo-N-[2-(4-m-trifluoromethylphenyl - 1 - piperazinyl)ethyl]benzo[b]thiophene-2-carboxamide When 5-bromobenzo[b]thiophene-2-carboxylic acid is treated with N,N'-carbonyldiimidazole and 2-(4-m-trifluoromethylphenyl-1-piperazinyl)ethylamine by the procedure of Example 4, the above compound is obtained.

Example 9.—Preparation of 4-fluoro-N-[4-(4-p-methoxyphenyl-1 - piperazinyl)butyl]benzo[b]thiophene - 2-carboxamide The above compound is obtained when 4-fluorobenzo[b]thiophene-2-carboxylic acid and N,N'-carbonyldiimidazole are treated with 4-(4-p-methoxyphenyl-1-piperazinyl)butylamine by the procedure of Example 4.

Example 10.—Preparation of 3,5-dimethyl-N-[5-(4-phenyl-1-piperazinyl)pentyl]benzo[b]thiophene - 2-carboxamide If 3,5-dimethylbenzo[b]thiophene-2-carboxylic acid is treated with N,N'-carbonyldiimidazole and 5-(4-phenyl-1-piperazinyl)pentylamine by the procedure of Example 4, the above compound is obtained.

Example 11.—Preparation of 3-bromo-7-methyl-N-[2-(4-phenyl - 1 - piperazinyl)ethyl]benzo[b]thiophene-2-carboxamide This compound is obtained when 3-bromo-7-methylbenzo[b]thiophene-2-carboxylic acid is substituted for benzo[b]thiophene-2-carboxylic acid in the procedure of Example 4.

Example 12.—Preparation of N-[2-(4-phenyl-1-piperazinyl)ethyl] - 6 - trifluoromethylbenzo[b]thiophene-2-carboxamide The above compound is obtained when 6-trifluoromethylbenzo[b]thiophene-2-carboxylic acid is substituted for benzo[b]thiophene-2-carboxylic acid in the procedure of Example 1.

Example 13.—Preparation of 3,4,6-trichloro-N-[2-(4-phenyl - 1 - piperazinyl)ethyl]benzo[b]thiophene-2-carboxamide The above compound is obtained when 2,4-dichlorocinnamic acid is substituted for cinnamic acid in the procedure of Example 2.

We claim:

1. A compound selected from the group of the formula:

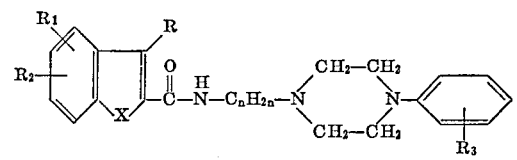

wherein R and $R_1$ are selected from the group consisting of hydrogen, straight chain lower alkyl and halogen; $R_2$ is selected from the group consisting of hydrogen, lower alkyl, halogen, and trifluoromethyl; $n$ is an integer from 2 to 5; $R_3$ is selected from the group consisting of lower alkyl, lower alkoxy, halogen and trifluoromethyl; X is oxygen or sulfur; and non-toxic acid addition salts thereof.

2. The compound in accordance with claim 1, N-[3-(4-phenyl - 1 - piperazinyl)propyl]benzo[b]thiophene-2-carboxamide.

3. The compound in accordance with claim 1, N-[3-(4-m-fluorophenyl - 1 - piperazinyl)propyl]benzo[b]thiophene-2-carboxamide.

4. The compound in accordance with claim 1, 3-chloro-N-[2 - (4 - phenyl-1-piperazinyl)ethyl]benzo[b]thiophene-2-carboxamide.

5. The compound in accordance with claim 1, N-[2-(4-phenyl - 1 - piperazinyl)ethyl]benzofuran-2-carboxamide.

6. The compound in accordance with claim 1, N-[3-(4-phenyl - 1 - piperazinyl)propyl]benzofuran-2-carboxamide.

7. The compound in accordance with claim 1, N-[2-(4-phenyl - 1 - piperazinyl)ethyl]-6-trifluoromethylbenzo[b]thiophene-2-carboxamide.

8. The compound in accordance with claim 1, 3,6-dichloro N-[2-(4-phenyl - 1 - piperazinyl)ethyl]benzo[b]thiophene-2-carboxamide.

References Cited

UNITED STATES PATENTS

| | | | |
|---|---|---|---|
| 3,198,807 | 8/1965 | Thominet | 260—268 BC |
| 3,381,009 | 4/1968 | Pallazzo | 260—268 BC |
| 3,491,098 | 1/1970 | Archer | 260—268 FT |
| 3,641,029 | 2/1972 | Wright | 260—268 BC |

OTHER REFERENCES

Thominet, in Chem. Abstr., vol. 72, col. 132503n (1972), abstracting Ger. Offen. 1,937,514.

Marly, in Chem. Abstr., vol. 67, col. 32600v (1967), abstracting Belg. 671,060.

DONALD G. DAUS, Primary Examiner

U.S. Cl. X.R.

424—250